(12) United States Patent
Walker, Jr.

(10) Patent No.: US 7,799,717 B2
(45) Date of Patent: *Sep. 21, 2010

(54) SPARK PLUG HAVING A CERAMIC INSULATOR WITH IMPROVED HIGH TEMPERATURE ELECTRICAL PROPERTIES

(75) Inventor: William J. Walker, Jr., Toledo, OH (US)

(73) Assignee: Federal Mogul World Wide, Inc., Southfield, MI (US)

( * ) Notice: Subject to any disclaimer, the term of this patent is extended or adjusted under 35 U.S.C. 154(b) by 598 days.

This patent is subject to a terminal disclaimer.

(21) Appl. No.: 11/611,946

(22) Filed: Dec. 18, 2006

(65) Prior Publication Data

US 2008/0143229 A1    Jun. 19, 2008

Related U.S. Application Data

(62) Division of application No. 10/984,135, filed on Nov. 9, 2004, now Pat. No. 7,169,723.

(60) Provisional application No. 60/519,395, filed on Nov. 12, 2003.

(51) Int. Cl.
C04B 35/48    (2006.01)

(52) U.S. Cl. .................. 501/105; 501/127; 501/128; 313/118

(58) Field of Classification Search ......... 313/118–145; 123/169 R, 169 EL, 32, 41, 310
See application file for complete search history.

(56) References Cited

U.S. PATENT DOCUMENTS 3,502,595 A    3/1970    Johnson et al.

3,615,763 A *  10/1971   Flock .................. 501/128
3,929,496 A    12/1975   Asano et al.
4,552,852 A    11/1985   Manning
4,751,207 A     6/1988   Manning
4,760,038 A     7/1988   Kinney, Jr. et al.

(Continued)

FOREIGN PATENT DOCUMENTS

DE    4215939 A1    11/1993

(Continued)

Primary Examiner—Peter J Macchiarolo
Assistant Examiner—Donald L Raleigh
(74) Attorney, Agent, or Firm—Robert L. Stearns; Dickinson Wright, PLLC

(57) ABSTRACT

A spark plug which includes a center electrode metal shell and an insulator disposed therebetween utilizes for the insulator or ceramic with improved high temperature electrical properties which includes alumina in an amount between about 90 and about 99% by weight, a zirconium containing compound in an amount between about 0 and about 1% by weight, and an oxide mixture in an amount between about 1 and about 10% by weight. The oxide mixture includes a glass former, a network modifier and alumina in an amount between about 16% and about 40% by weight after firing, wherein the molar ratio of the glass former to the network modifier ranges between about 0.8:1 and 1.2:1. The ceramic insulator is particularly adapted for use as an insulator in a spark plug to provide improved dielectric strength and shunt resistance of greater than one 1000 megaohms at 1000 degrees Fahrenheit, so as to reduce the shunting of the spark plug and thereby improve the quality of the spark generated by the spark plug.

18 Claims, 6 Drawing Sheets

U.S. PATENT DOCUMENTS

| | | | |
|---|---|---|---|
| 4,879,260 A * | 11/1989 | Manning | 501/32 |
| RE34,028 E | 8/1992 | Manning | |
| 5,147,833 A | 9/1992 | Manning et al. | |
| 5,273,474 A | 12/1993 | Oshima et al. | |
| 6,166,481 A * | 12/2000 | Knapp et al. | 313/141 |
| 6,239,052 B1 | 5/2001 | Fukushima | |
| 6,559,579 B2 | 5/2003 | Ito et al. | |
| 7,169,723 B2 * | 1/2007 | Walker, Jr. | 501/105 |
| 2002/0033659 A1 * | 3/2002 | Nishikawa et al. | 313/118 |
| 2003/0127959 A1 * | 7/2003 | Nishikawa et al. | 313/143 |
| 2005/0110382 A1 * | 5/2005 | Walker, Jr. | 313/143 |
| 2008/0143229 A1 * | 6/2008 | Walker | 313/143 |

FOREIGN PATENT DOCUMENTS

| | | |
|---|---|---|
| JP | 53 126008 A | 11/1978 |
| JP | 1 143368 A | 6/1989 |

* cited by examiner

SPARK PLUG HAVING A CERAMIC INSULATOR WITH IMPROVED HIGH TEMPERATURE ELECTRICAL PROPERTIES

CROSS-REFERENCE TO RELATED PATENT APPLICATIONS

This application is a divisional application of U.S. application Ser. No. 10/984,135 filed Nov. 9, 2004, now issued as U.S. Pat. No. 7,169,723, which claims priority to U.S. Provisional Patent Application Ser. No. 60/519,395 filed on Nov. 12, 2003, both of which are hereby incorporated herein by reference in their entirety.

BACKGROUND OF THE INVENTION

1. Technical Field

The present invention generally relates to ceramic materials. More particularly, it relates to ceramic materials used in insulators of spark plugs.

2. Related Art

Spark plugs, glow plugs, and other such devices used in internal combustion engines are subjected to high temperature environments in the region of about 1,000° C. In general, a spark plug is a device that extends into a combustion chamber of an internal combustion engine and produces a spark to ignite a combustible mixture of air and fuel therein. Specifically, a spark plug typically includes a cylindrical metal shell having external threads that screw into a portion of the engine and further having a hook-shaped ground electrode attached thereto at a firing end of the spark plug. A cylindrical insulator is disposed partially within the metal shell, and extends axially beyond the metal shell toward the firing end. A conductive terminal is disposed within a cylindrical insulator at a terminal end of the spark plug opposite the firing end. At the firing end, a cylindrical center electrode is disposed within the insulator and projects axially out of the insulator toward the ground electrode, whereby a spark plug gap is defined between the electrodes.

In operation, ignition voltage pulses of up to about 40,000 volts are applied through the spark plug to the center electrode, thereby causing a spark to jump the gap between the center and ground electrodes. The spark ignites an air and fuel mixture within the combustion chamber to create high temperature combustion to power the engine. Unfortunately, the high voltage and high temperature environment within the combustion chamber can degrade the different components of the spark plug and, over time, can negatively affect the characteristics of these components, thus altering the intensity of the ignition pulse over time and ultimately degrading the quality of the spark. In particular, degradation of the ceramic insulator can lead to dielectric puncture through the insulator which establishes an alternative electrical path through the insulator, and consequently the spark may not reliably jump the gap between the center and ground electrodes. The quality of the spark affects the ignition of the mixture of the air and fuel (i.e., the combustion efficiency, combustion temperature, combustion products) and, thus, the power output and fuel efficiency performance of the engine and the nature of the emissions produced by the combustion of the air and fuel. Due to an increasing emphasis on regulation of emissions from motor vehicles, it is desirable to maintain a high quality spark to provide constant, consistent engine performance and emission quality. The quality of the spark is determined by several factors including the material composition of the ceramic insulator material.

The ceramic insulator materials used for the cylindrical insulator are dielectric materials. Dielectric strength is generally defined as the maximum electric field which can be applied to the material without causing breakdown or electrical puncture thereof. For a device such as a spark plug, dielectric strength is generally measured in kilovolts per mil (kV/mil). For a given spark plug design, the insulator dimensions are fixed, thus, dielectric strength is frequently expressed as a breakdown voltage in kV, rather than in kV/mil. A typical value for spark plug dielectric strength for a standard spark plug design used in many applications is on the order of about 40 kV at room temperature. Dielectric strength of the ceramic insulators used in spark plugs is also a function of temperature. High temperatures tend to cause an increase in the mobility of certain ions in these ceramic materials, allowing a small leakage current to pass through the ceramic. This leakage of current leads to localized heating which gradually degrades the resistance of the material to dielectric puncture. It has been observed that resistance of ceramic materials to dielectric breakdown tends to decrease over the life of a spark plug due to thermal stress on the spark plug cycling under an applied electric field and due to attendant thermal-electrical fatigue thereof. The exact nature of the microstructural and/or compositional changes are not completely understood, but are believed to be associated with localized heating to temperatures sufficient to bring about partial melting of the ceramic material.

Shunt resistance is another measurable property of ceramics, particularly for those used in spark plugs, and is a measure of the electrical resistance of the material which is generally measured in megaohms. A typical value for spark plug shunt resistance is on the order of about 75 to 125 megaohms at an operating temperature of about 1000 degrees Fahrenheit. Shunt resistance is typically measured on a spark plug as an electrical resistance imposed by or associated with the ceramic insulator—measured between the center electrode and metal shell of the spark plug. In other words, shunt resistance is indicative of the amount of current leakage through the ceramic insulator between the center electrode and metal shell or housing. Whereas dielectric breakdown tends to be a sudden, discrete event, low shunt resistance tends to take the form of a continuous, parasitic loss, which may ultimately result in an increased likelihood of catastrophic dielectric failure after the spark plug has been in used for an extended period of time.

A breakdown in dielectric strength and/or shunt resistance ultimately leads to shunting of the spark plug. Shunting of the spark plug is a condition in which an undesirable parallel conductive path is established between the center electrode and the metal casing in addition to the path across the spark gap between the center electrode and the ground electrode. Shunting generally has an adverse affect on the quality of the spark generated by the spark plug. In the case of shunting due to dielectric breakdown the affect is generally catastrophic. However, in the case of shunting caused by diminished or insufficient shunt resistance, the affect is may simply degrade the spark performance of the plug, and consequently the performance of the engine, as described above, or may result in an increased likelihood of catastrophic dielectric loss after the spark plug has been in use for an extended period of time.

Therefore, it would be desirable to produce a spark plug using an improved ceramic insulator material with high shunt resistance that is less susceptible to a breakdown in dielectric strength for extended periods of time at high voltages and high temperatures and, thus, less susceptible to shunting conditions in the spark plug, in order to promote generation of a quality spark and enhanced engine performance.

SUMMARY OF THE INVENTION

The above-noted shortcomings of prior art spark plugs are overcome by the present invention which provides spark plugs having ceramic insulators with improved shunt resistance and dielectric breakdown properties, so as to reduce shunting of the spark plugs and thereby improve the quality of the spark generated by the spark plugs and improved performance of the engines in which they are utilized.

According to one aspect of the present invention, there is provided a spark plug that includes a center electrode, a metal shell, and an insulator disposed between the center electrode and the metal shell. The insulator includes between about 90 and 99% alumina by weight, between about 0.01 and 1% zirconium containing compound by weight, and between about 1 and 10% oxide mixture by weight. The oxide mixture includes a glass former, a network modifier, and alumina in an amount between 16% and about 40% by weight after firing, wherein the molar ratio of the glass former to the network modifier range between about 0.8:1 and 1.2:1. The glass former may comprise $SiO_2$. The network modifiers may comprise at least one of MgO, CaO, SrO, BaO $Na_2O$, $K_2O$ and $Li_2O$.

In accordance with yet another aspect of the present invention, there is provided a spark plug including a metal shell, a center electrode, and an insulator disposed in the metal shell and having a central bore with the center electrode being disposed in the central bore. The insulator includes alumina and has a shunt resistance of greater than 1000 megaohms at 1000 degrees Fahrenheit.

BRIEF DESCRIPTION OF THE DRAWINGS

These and other features and advantages of the present invention will become more readily appreciated when considered in connection with the following detailed description and appended drawings, wherein like designations denote like elements, and wherein.

DETAILED DESCRIPTION OF THE PREFERRED EMBODIMENT

Figure 1:
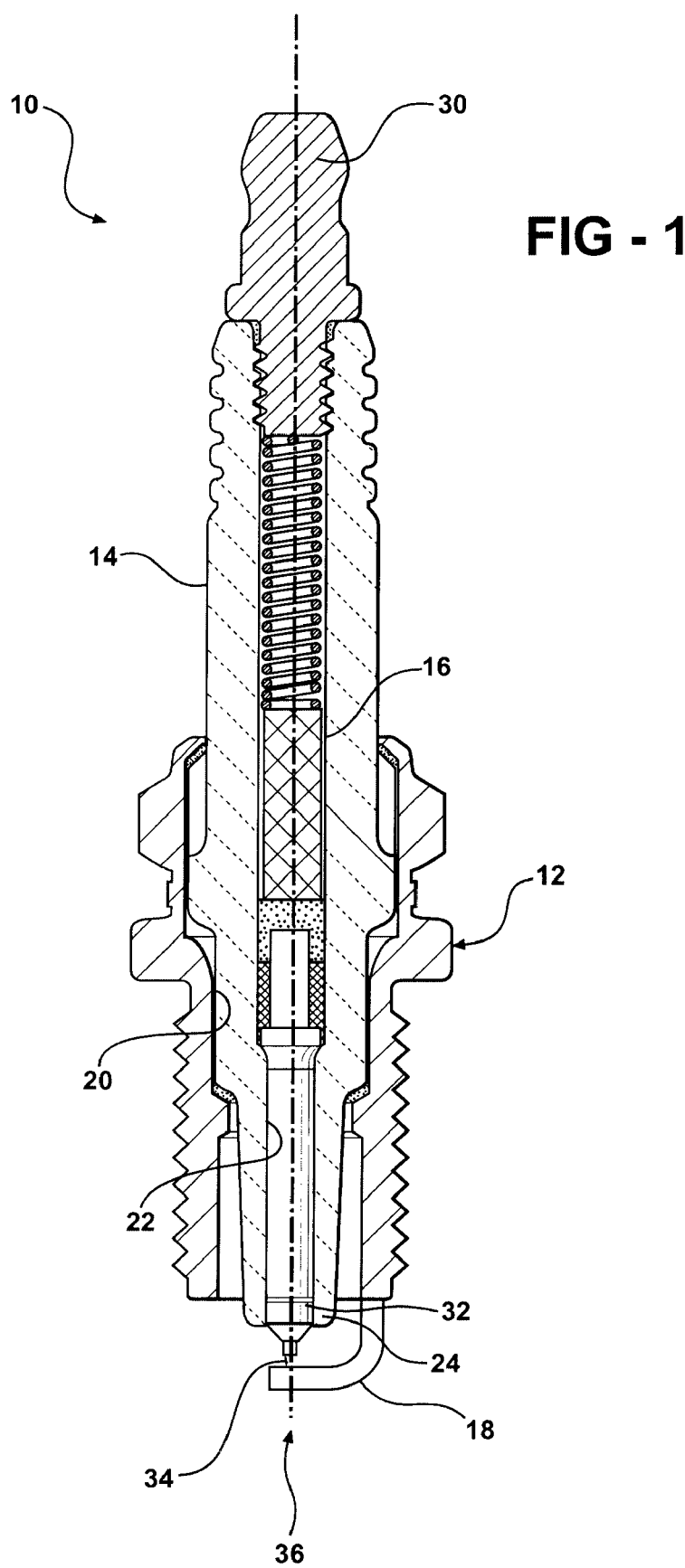
FIG. 1 shows a partial fragmentary view of a spark plug having a ceramic insulator in accordance with the present invention.

The present invention relates generally to ignition devices for high temperature applications, such as spark plugs, igniters and other spark generation devices. With reference to FIG. 1, there is shown an ignition device comprising a spark plug assembly 10 for use in an internal combustion engine (not shown) that generally includes a metal shell 12, a ceramic insulator 14, a center wire assembly 16, and a ground electrode 18. As commonly known in the art, the shell 12 is a generally cylindrical, electrically conductive component having a hollow bore 20 extending along its axial length. Within that bore 20 are a series of circumferential shoulders sized to support diametrically reduced sections of the insulator 14. Like the shell 12, the insulator 14 is also a generally cylindrical component with an elongated axial bore 22. The lower axial end of the insulator 14 comprises a nose portion 24 which generally extends out of and beyond the lowermost portion of the shell 12. The insulator axial bore 22 is designed to receive the electrically conductive center wire assembly 16, which extends the entire axial length of the spark plug 10 and generally includes a terminal electrode 30 at one end and a center electrode 32 at another end. Of course, the center wire assembly 16 shown here is simply of a typical embodiment, and could include additional components or have components omitted. The ground electrode 18 is both mechanically and electrically connected to the lower axial end of the shell 12 and is generally formed in an L-shape configuration. The exposed end of the center electrode 32 and a side surface of the ground electrode 18 oppose each other and thereby define a spark gap 34 at a firing end 36 of the spark plug 10.

In operation, the terminal electrode 30 receives a high voltage ignition pulse from an ignition system (not shown) which travels along the center wire assembly 16 until it reaches the lower exposed end of the center electrode 32. If the pulse has sufficient energy to bridge the spark gap 34, a spark is formed between the center electrode 32 and the ground electrode 18, which in turn is grounded to the engine via the shell 12. The spark ignites a fuel/air mixture which has previously been injected into a combustion chamber within the engine, which in turn initiates the combustion process used to power the engine. The previous explanation was provided as a general overview of the construction and operation of the ignition device. Additional detail about ceramic insulator 14 is provided in accordance with the present invention.

Insulator 14 of the present invention is an alumina-based ceramic. In general, alumina-based ceramics comprise fine crystalline $Al_2O_3$ particles in an oxide mixture matrix. The oxide mixture is preferably a generally amorphous glass matrix, such as various types of silicate glasses, but may also include crystalline materials as part of the oxide mixture. Alumina-based ceramics tend to have relatively high mechanical and dielectric strength, as well as high electrical resistivity and low dielectric loss, and are known to retain these properties over a relatively wide temperature range. But, the properties of alumina ceramics are degraded by impurities in the material, thermal fatigue, high voltage, high operating temperatures, and the like. U.S. Pat. No. 4,879,260 of Manning indicates that the addition of zirconia to an alumina-based ceramic tends to positively affect the mechanical strength thereof, particularly when the zirconia comprises between 0.5 to 1.0 percent of the composition by weight.

A focus of the present invention, however, is not to improve mechanical strength of an alumina-based ceramics, but rather to provide a ceramic insulator with improved dielectric strength and shunt resistance, such that it is particularly adapted for use in ignition devices. To this end, experiments were conducted that involved varying the amounts of alumina, the materials and related amounts that comprise the oxide mixture matrix, and the amounts of zirconia to obtain alumina-based ceramics having a combination of improved dielectric strength or shunt resistance, or both. The amount of alumina was discovered to be preferably between 90 and 99% of the ceramic composition by weight. The oxide mixture matrix is composed of a glass former, which is preferably $SiO_2$ but may also include $B_2O_3$, $P_2O_5$, and the like. The oxide mixture matrix is also composed of one or more network modifiers, preferably CaO, MgO, BaO, and SrO, but may also include other alkaline earth metal oxides, or alkali metal oxides such as $Na_2O$, $K_2O$, $Li_2O$ and the like. The network modifiers may also be known as fluxes. The oxide matrix may also be composed of network intermediates, such as $Al_2O_3$, but may also include other network intermediates such as $TiO_2$, ZnO, $ZrO_2$ and the like. Since $Al_2O_3$ is somewhat soluble in the oxide mixture, an equilibrium will exist between the primary $Al_2O_3$ constituent in the form of $Al_2O_3$ crystals and $Al_2O_3$ which is dissolved in the oxide mixture where it acts as a network intermediate. The amount of $Al_2O_3$ that is dissolved in the oxide mixture is very difficult to measure analytically, but based on the phase equilibrium diagram is believed to constitute was much as 40% of the oxide mixture by weight for compositions in the range of the present invention. It was discovered that adding certain relatively small levels of a zirconium-based compound, such as zirconia ($ZrO_2$), tends to reduce crystallization within the oxide matrix, as well as improve mechanical strength of the ceramic. Crystallization tends to result in higher electrical conductivity. Therefore, the addition of the zirconia tends to lower the electrical conductivity of the oxide mixture matrix portion of the ceramic.

Experiments were conducted to determine the effect of ceramic material composition on the performance of spark plug insulators. The ceramics were prepared by mixing Alcan C-761 alumina with appropriate amounts of commercially available precursor oxide mixture matrix materials, such as EPK kaolin, HuberCarb calcium carbonate, magnesite, dolomite, wollastonite and Yellowstone Talc, and with appropriate amounts of Zirox Zirconia which form oxides upon heating. The powder mixture constituents used to produce ceramic insulator materials of the invention were ball milled in an aqueous slurry comprising about 73 percent solids by weight or about 40 percent solids by volume. Batches totaling 5000 grams of powder were prepared by ball milling of the materials, followed by spray drying in a tower spray-dryer. The spray granulate was then compacted by dry-bag isostatic pressing at 8500 psi and formed into the shape of insulator 14, and fired at temperatures between 1590 and 1630 degrees Celsius for approximately 3 hours in order to sinter the insulators such that the alumina particles are interconnected by the oxide mixture matrix.

The experiments were designed to evaluated three different levels of four variables of material composition. Table 1 below depicts a summary of the variables used in the experiment. The various material compositions specified herein are for purposes of illustrating and disclosing the present invention, and are not to be construed as limiting the scope thereof. The experiments were conducted using nine different batches of material that are identified as batches 03-B-17 through 03-B-25.

TABLE 1

| Variable (Material) | Description | Levels | Values of Levels |
|---|---|---|---|
| Alumina | Weight Percent of Alumina | 3 | 94%, 95%, 96% |
| Zirconia | Weight Percent of Zirconia | 3 | 0.0%, 0.15%, 0.30% |
| CaO | Mole Fraction CaO/(RO) | 3 | 0.8, 0.9, 1.0 |
| SiO2 | Mole Fraction $SiO_2$/(RO) | 3 | 0.8, 1.0, 1.2 |

The network modifiers can be identified in general by the designation RO, wherein RO represents the total amount of network modifier present in the ceramic composition. In Table 1, RO=MgO=CaO. In general, RO is the sum of all network formers present. If the network formers include CaO, MgO, BaO and SrO, then RO=CaO=MgO=BaO=SrO.

The material compositions of the various batches are reported in a combination of weight percents and molar amounts. The composition of the oxide matrix is reported herein in molar amounts because of the degree of variation in the atomic weights of the network modifiers that may be used in the present invention. The ratio of atoms in the oxide mixture matrix greatly influences the electrical properties thereof. Since the atomic weights of calcium, magnesium, barium, and strontium vary significantly, they cannot be readily substituted on a weight basis to achieve the specific compositions of network modifiers discussed herein. Thus, it is preferred to express the components of the oxide mixture matrix in terms of moles rather than in terms of weight.

Accordingly, Table 2A is an experiment matrix that reports the various experiment and composition levels used for each material in weight percent for alumina and zirconia, and in molar ratio for the preferred network modifiers and glass formers. Table 2B, however, reports all of the materials in weight percent. Similarly, Table 2C reports in weight percent, the precursor materials, by batch composition.

TABLE 2A

| Batch ID | Run Order | DOE Order | $Al_2O_3$ wt % | $ZrO_2$ wt % | MgO mol | CaO mol | $SiO_2$ mol |
|---|---|---|---|---|---|---|---|
| 03-B-24 | 8 | 1 | 94.00 | 0.00 | 0.20 | 0.80 | 0.80 |
| 03-B-19 | 3 | 2 | 95.00 | 0.15 | 0.10 | 0.90 | 0.80 |
| 03-B-17 | 1 | 3 | 96.00 | 0.30 | 0.00 | 1.00 | 0.80 |
| 03-B-20 | 4 | 4 | 94.00 | 0.30 | 0.10 | 0.90 | 1.00 |
| 03-B-23 | 7 | 5 | 95.00 | 0.00 | 0.00 | 1.00 | 1.00 |
| 03-B-22 | 6 | 6 | 96.00 | 0.15 | 0.20 | 0.80 | 1.00 |
| 03-B-25 | 9 | 7 | 94.00 | 0.15 | 0.00 | 1.00 | 1.20 |
| 03-B-21 | 5 | 8 | 95.00 | 0.30 | 0.20 | 0.80 | 1.20 |
| 03-B-18 | 2 | 9 | 96.00 | 0.00 | 0.10 | 0.90 | 1.20 |
| | Minimum | | 94.00 | 0.00 | 0.00 | 0.80 | 0.80 |
| | Maximum | | 96.00 | 0.30 | 0.20 | 1.00 | 1.20 |

TABLE 2B

| Batch ID | Run Order | DOE Order | $Al_2O_3$ wt % | $ZrO_2$ wt % | MgO wt % | CaO wt % | $SiO_2$ wt % |
|---|---|---|---|---|---|---|---|
| 03-B-24 | 8 | 1 | 94.00 | 0.00 | 0.48 | 2.67 | 2.86 |
| 03-B-19 | 3 | 2 | 95.00 | 0.15 | 0.19 | 2.39 | 2.27 |
| 03-B-17 | 1 | 3 | 96.00 | 0.30 | 0.00 | 1.99 | 1.71 |
| 03-B-20 | 4 | 4 | 94.00 | 0.30 | 0.20 | 2.51 | 2.99 |
| 03-B-23 | 7 | 5 | 95.00 | 0.00 | 0.00 | 2.41 | 2.59 |
| 03-B-22 | 6 | 6 | 96.00 | 0.15 | 0.27 | 1.53 | 2.05 |
| 03-B-25 | 9 | 7 | 94.00 | 0.15 | 0.00 | 2.56 | 3.29 |
| 03-B-21 | 5 | 8 | 95.00 | 0.30 | 0.30 | 1.69 | 2.71 |
| 03-B-18 | 2 | 9 | 96.00 | 0.00 | 0.13 | 1.59 | 2.28 |
| | Minimum | | 94.00 | 0.00 | 0.00 | 1.53 | 1.71 |
| | Maximum | | 96.00 | 0.30 | 0.48 | 2.67 | 3.29 |

TABLE 2C

| Batch ID | Run Order | DOE Order | Yellow-stone Talc | Huber-Carb Calcium Carbonate | EPK Kaolin | Alcan C-761 Alumina | ZIROX Zirconia |
|---|---|---|---|---|---|---|---|
| 03-B-24 | 8 | 1 | 1.59 | 4.91 | 4.50 | 89.00 | 0.00 |
| 03-B-19 | 3 | 2 | 0.63 | 4.41 | 4.28 | 90.53 | 0.15 |
| 03-B-17 | 1 | 3 | 0.00 | 3.68 | 3.73 | 92.28 | 0.30 |
| 03-B-20 | 4 | 4 | 0.67 | 4.68 | 5.86 | 88.49 | 0.30 |
| 03-B-23 | 7 | 5 | 0.00 | 4.50 | 5.70 | 89.80 | 0.00 |
| 03-B-22 | 6 | 6 | 0.92 | 2.83 | 3.49 | 92.62 | 0.15 |
| 03-B-25 | 9 | 7 | 0.00 | 4.82 | 7.32 | 87.71 | 0.15 |
| 03-B-21 | 5 | 8 | 1.02 | 3.14 | 4.87 | 90.66 | 0.30 |
| 03-B-18 | 2 | 9 | 0.43 | 2.97 | 4.56 | 92.05 | 0.00 |
|  |  | Minimum | 0.00 | 2.83 | 3.49 | 87.71 | 0.00 |
|  |  | Maximum | 1.59 | 4.91 | 7.32 | 92.62 | 0.30 |

Insulators 14 were produced using the above-described material compositions. The insulators were tested for their resistance to dielectric puncture. In order to test the dielectric puncture resistance, the insulators were placed in a fixture comprising a center electrode that passed through the axial bore of the insulator. A ground electrode was placed around the exterior surface of the insulator at a point where the thickness of the insulator was about 0.100 inches. The test fixture and insulator were immersed in a dielectric fluid to prevent arcing of the electric current around the insulator. A Hipotronics dielectric tester was used to apply a 60 Hertz alternating current electrical field to the insulator. Voltage was ramped at a rate of 200 volts per second until dielectric puncture of the insulator occurred. The peak voltage at the time of failure was reported as the dielectric puncture voltage. The results of the testing are set forth in Table 3 below.

TABLE 3

| Composition | Voltage kV | | | | | | | | |
|---|---|---|---|---|---|---|---|---|---|
|  | 03-B-17 | 03-B-18 | 03-B-19 | 03-B-20 | 03-B-21 | 03-B-22 | 03-B-23 | 03-B-24 | 03-B-25 |
| Average | 40.9 | 36.9 | 37.8 | 35.1 | 37.8 | 39.3 | 39.2 | 34.5 | 34.9 |
| Standard Deviation. | 1.7 | 2.0 | 2.5 | 1.7 | 3.0 | 3.0 | 2.1 | 1.8 | 4.1 |
| Minimum | 37.6 | 33.2 | 32.5 | 32.4 | 32.1 | 30.8 | 31.4 | 31.5 | 19.2 |
| Maximum | 45.1 | 43.0 | 45.2 | 39.0 | 47.9 | 44.3 | 43.8 | 39.9 | 39.0 |
| No. Specimens | 60 | 58 | 28 | 26 | 44 | 38 | 60 | 51 | 30 |

Figure 2:
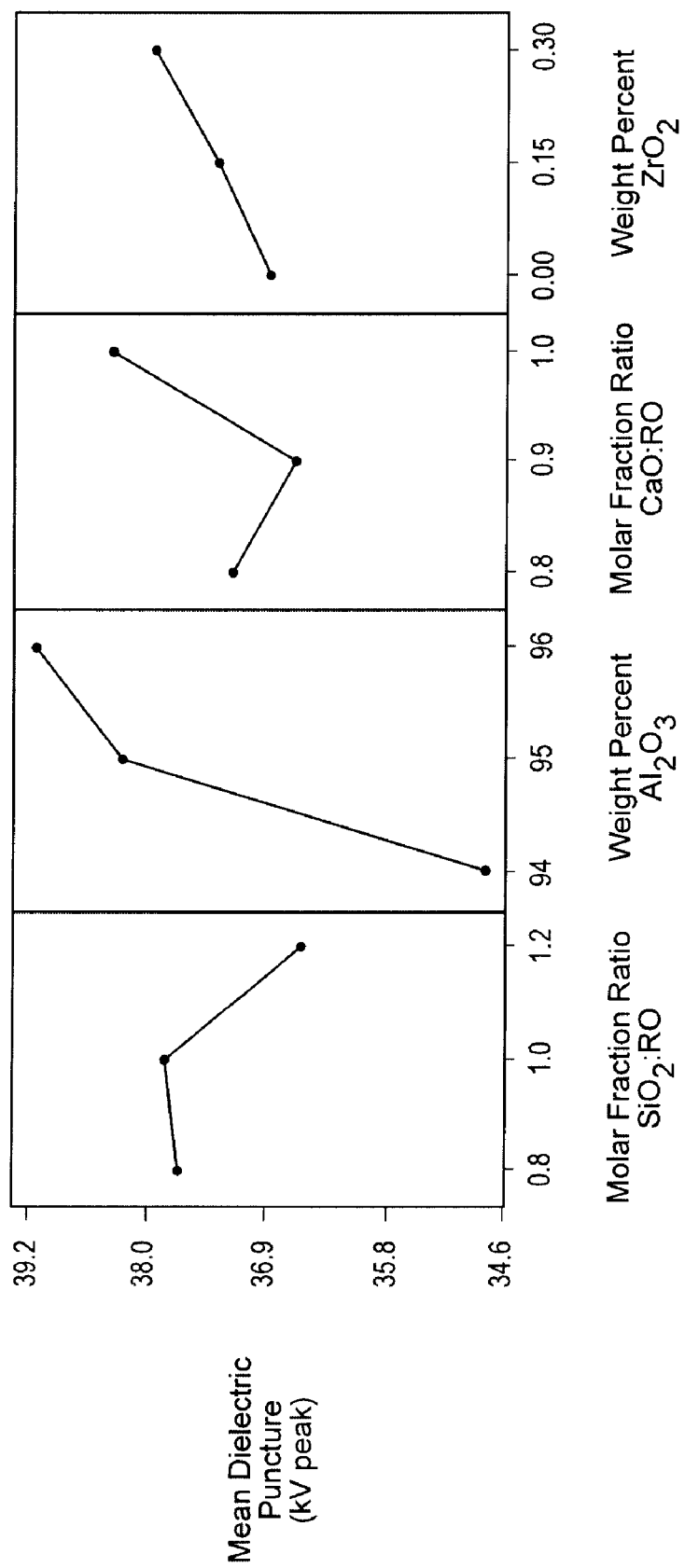
FIG. 2 is a main effects plot of mean dielectric peak puncture values for several material composition variables of the ceramic of the present invention.

A main effects plot of mean dielectric puncture values is illustrated in FIG. 2 in terms of kilovolts. As can be seen, the plot of $Al_2O_3$ content reveals the most significant increase in resistance to dielectric puncture over the three levels of the $Al_2O_3$ variable. Accordingly, the amount of alumina is believed to be the variable with the most significant effect on dielectric puncture. In general, higher alumina content in the ceramic tends to result in higher dielectric puncture values, and vice-versa. In other words, the data reveal that increases in resistance to dielectric puncture of the ceramic are most dependent upon increases in the quantity of alumina. Other variables, such as the $SiO_2$:RO ratio (RO being in this instance CaO+MgO), the CaO:RO ratio, and the amount of zirconia are not believed to have as significant of an effect on dielectric puncture. However, since no maxima or minima was observed with regard to the effect of the zirconia content, and puncture performance improved with increasing zirconia content, it is believed that zirconia content including higher zirconia contents than those tested, may provide a useful means for improving the dielectric puncture performance of these ceramics. It is believed that a dielectric puncture threshold of over 41 kilovolts may be repeatably achieved with the ceramic formulations of the present invention.

The insulators were also tested for shunt resistance at 1,000 degrees Fahrenheit. In order to measure shunt resistance, the insulators were assembled into spark plugs and the ground electrodes were removed. The spark plugs were mounted in a fixture comprising an electrically grounded Inconel plate with threaded holes to receive the shells of the spark plugs and the fixture was placed into an electric furnace. Electrodes were placed on the terminals of each spark plug, with leads that passed through the door of the furnace. The furnace was heated to a temperature of 1000 degrees Fahrenheit and the resistance of each spark plug was measured between the electrically grounded Inconel plate and the terminal lead using a Keithley electrometer model number 6517A. The results of the shunt resistance testing are shown below in Table 4 and reported in megaohms.

TABLE 4

| Batch | Specimen #1 | Specimen #2 | Specimen #3 | Average |
|---|---|---|---|---|
| 03-B-17 | 2970 | 3840 | 2130 | 2980 |
| 03-B-18 | 898 | 1080 | 1740 | 1239 |
| 03-B-19 | 2060 | 3790 | 3390 | 3080 |
| 03-B-20 | 4920 | 11800 | 2530 | 6417 |
| 03-B-21 | 1050 | 8840 | 2700 | 4197 |
| 03-B-22 | 9900 | 3880 | 4880 | 6220 |
| 03-B-23 | 3550 | 2640 | 4380 | 3523 |
| 03-B-24 | 2630 | 482 | 2550 | 1887 |
| 03-B-25 | 2230 | 1020 | 3690 | 2313 |

Figure 3:
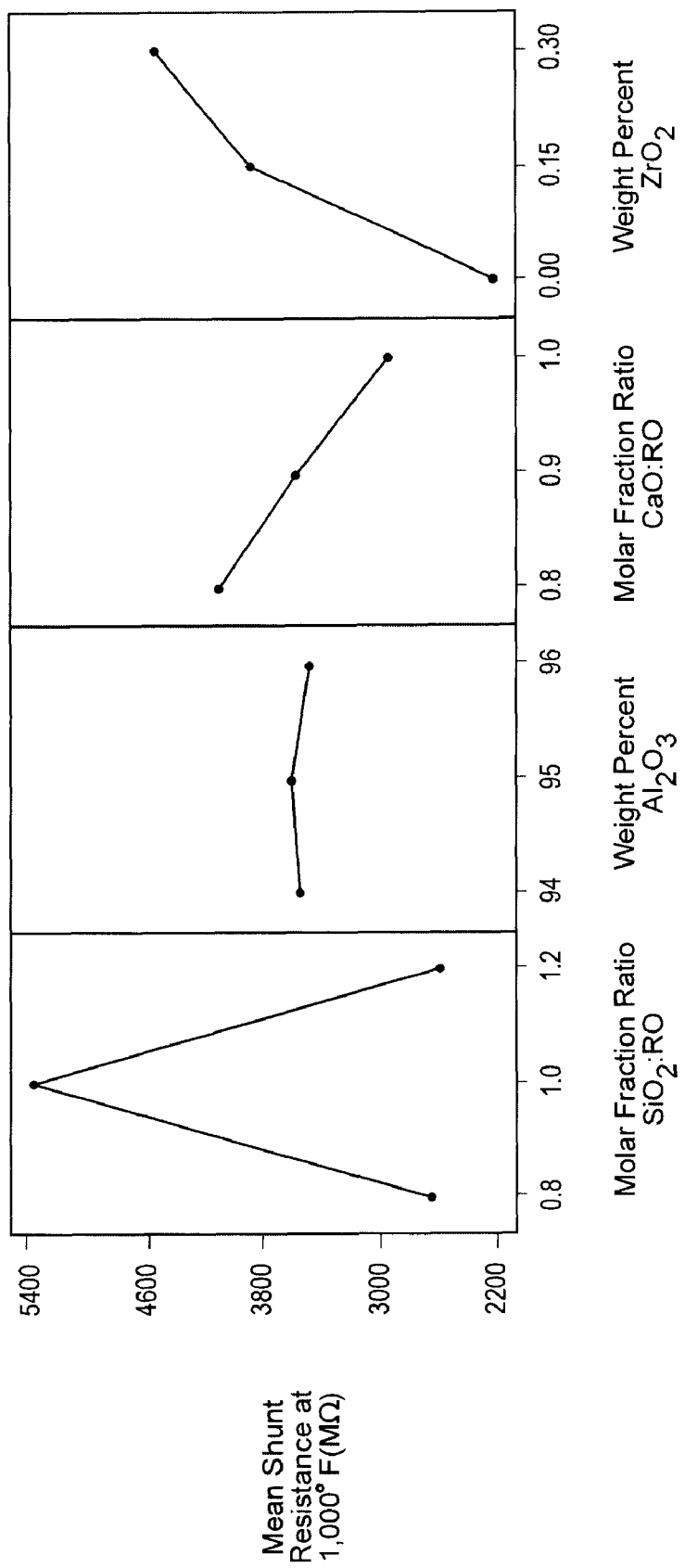
FIG. 3 is a main effects plot of mean shunt resistance values for several material composition variables of the ceramic of the present invention.

A main effects plot of mean shunt resistance values is illustrated in FIG. 3. As can be seen, the plot of shunt resistance as a function of the $SiO_2$ content illustrated in the form of the $SiO_2$ to RO ratio (RO in this instance being CaO+MgO) reveals the most significant effect on shunt resistance. The plot indicates a maximum effect on shunt resistance occurring at a ratio of 1.0. The amount of zirconia is believed to have the second largest effect on shunt resistance, with a maximum at about 0.3 weight percentage, which was the highest zirconia content in the test samples. However, since no clear maxima or minima was observed, it is believed that higher zirconia contents may provide even greater shunt resistance values. The CaO content, illustrated in the plot in the form of the CaO to RO ratio, is believed to have the third largest effect on shunt resistance with a maxima at a ratio of about 0.8. Surprisingly, in direct contrast to the dielectric breakdown testing, the alumina content did not appear to have a significant effect on shunt resistance.

To account for the non-linearity of the $SiO_2$ to RO ratio plot, a multiple regression analysis was performed including an $SiO_2$ squared term for the $SiO_2$ to RO ratio. An initial analysis revealed that $Al_2O_3$ was not statistically significant, so this variable was removed for a final analysis. The results of the final analysis indicated that the R-squared value from the regression was 0.98, indicating that the multiple regression model analysis accounts for 98% of the variability in shunt resistance.

Figure 4:
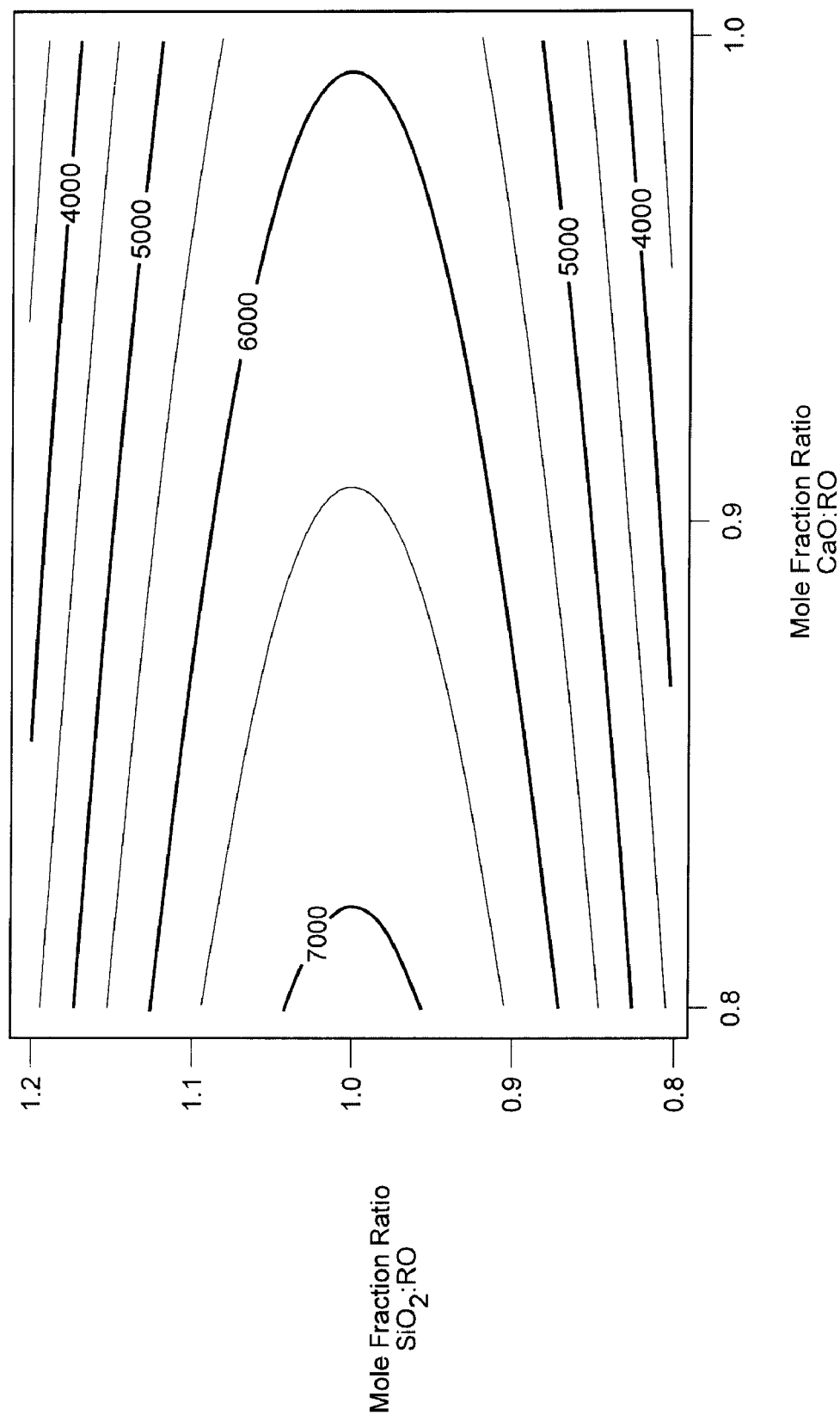
FIG. 4 is a contour plot showing lines of fixed shunt resistance for two material composition variables of the matrix mixture within the ceramic of the present invention.

The influence of the composition of the matrix on the shunt resistance of the ceramic is illustrated as a contour plot in FIG. 4. The contour plot illustrates that shunt resistance, at about 7000 megaohms, is achievable at 1000 degrees Fahrenheit with an $SiO_2$:RO ratio of approximately 1.0 and a CaO:RO ratio of about 0.8. Further, the shunt resistance has more sensitivity to changes in the molar ratio of $SiO_2$:RO than the molar ratio of CaO:RO.

Figure 5:
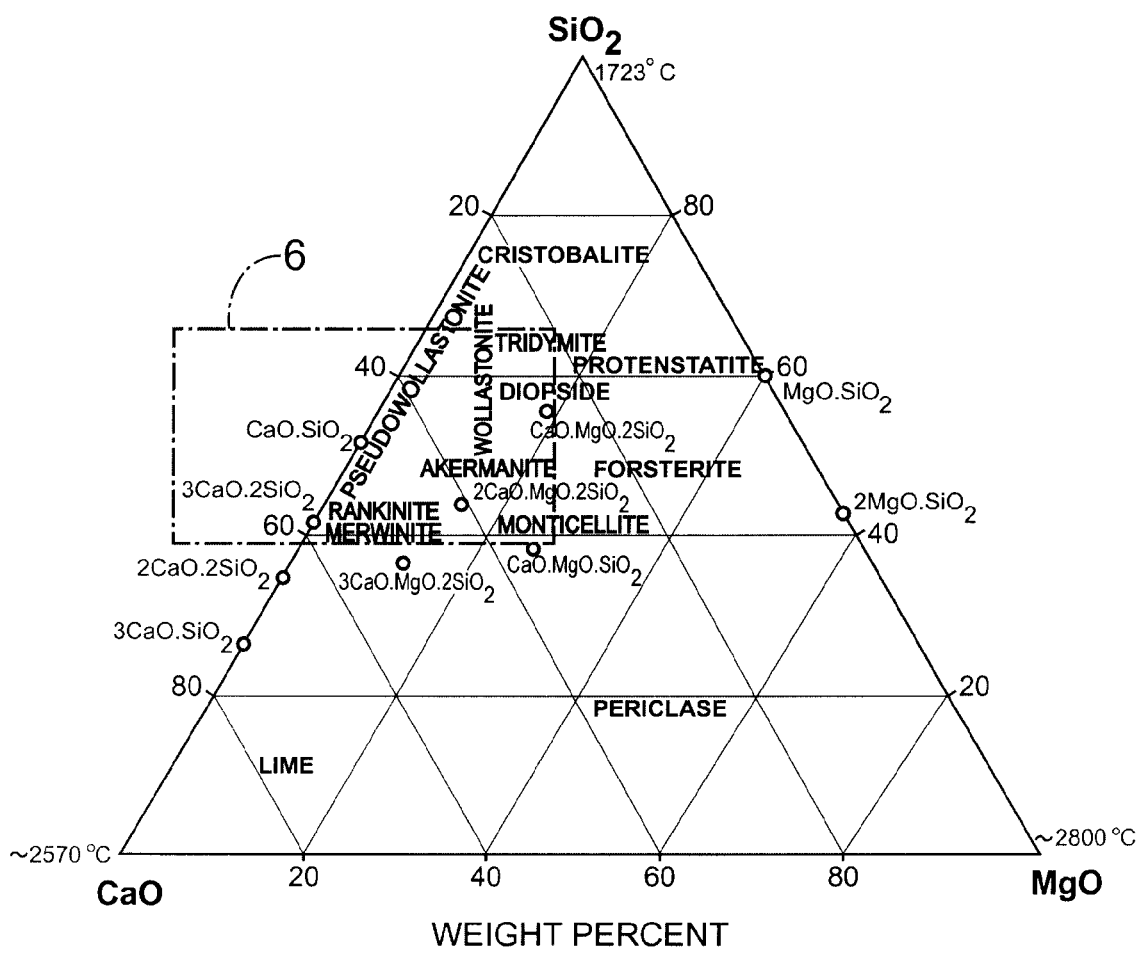
FIG. 5 is a schematic illustration of a CaO—$SiO_2$—MgO phase equilibrium diagram.
Figure 6:
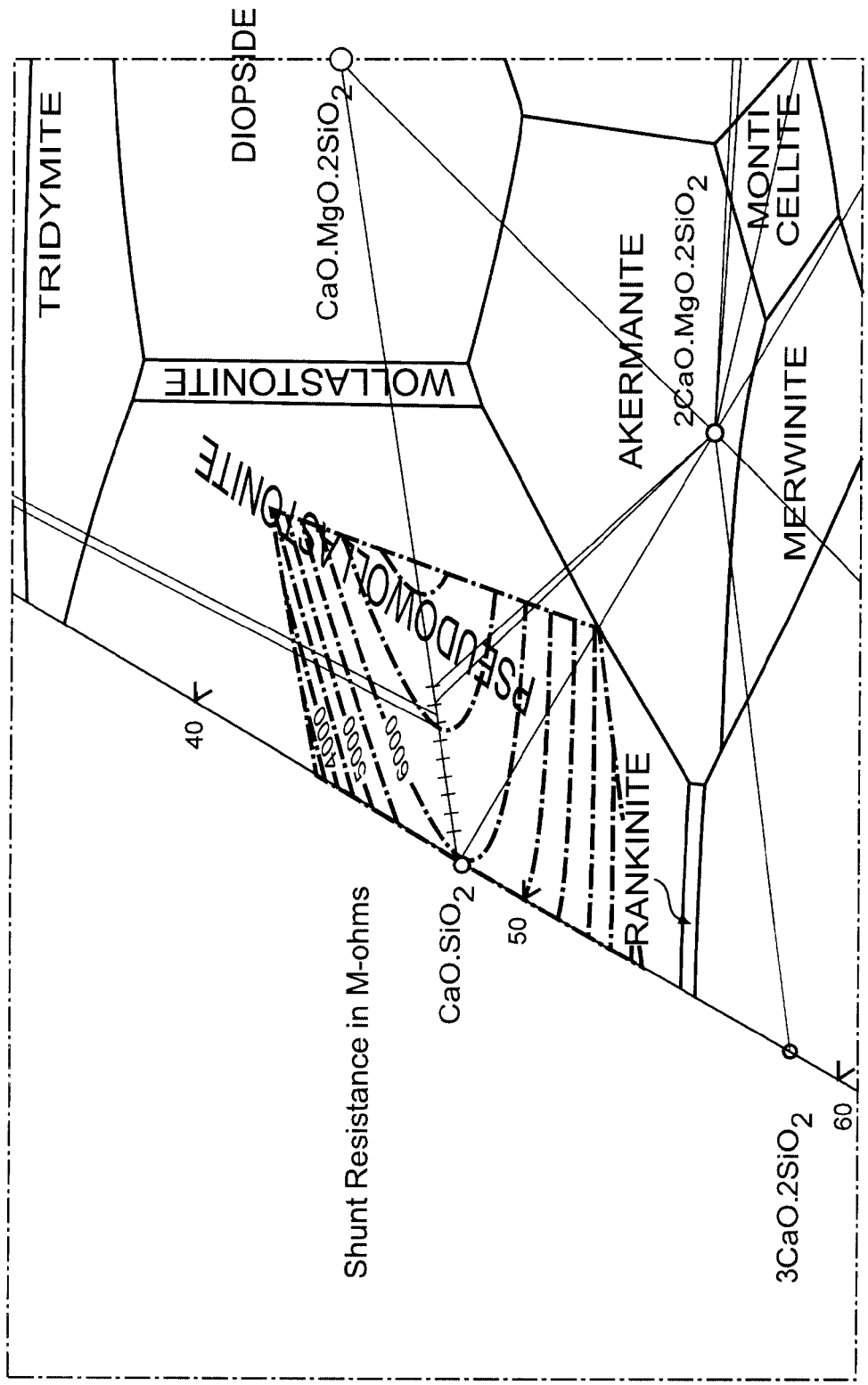
FIG. 6 is a partial illustration of a phase equilibrium diagram for CaO—$SiO_2$—MgO, showing an overlaid contour plot of shunt resistance.

Similarly, FIG. 6 illustrates another contour plot of shunt resistance as a function of the molar ratios of $SiO_2$ and CaO, similar to that of FIG. 4, that is overlaid onto a portion of a phase equilibrium diagram for CaO, $SiO_2$, and MgO. FIG. 5 is a schematic illustration of the CaO, $SiO_2$ and MgO ternary phase diagram illustrating generally the region utilized in conjunction with the compositions of the present invention and described in greater detail in FIG. 6. The phase diagram utilized for the overlay of FIG. 6 is available from the American Ceramics Society, Columbus, Ohio. The left most boundary of the contour plot depicts the left most boundary of the phase equilibrium diagram wherein the amount of CaO and $SiO_2$ are varying as shown and the amount of MgO is zero. The right most boundary of the contour plot is delimited by a CaO to RO molar ratio of about 0.8, wherein 80% of the network modifier includes CaO and 20% of the network modifier includes MgO. The lower and upper boundaries of the contour plot depict the SiO2 to RO molar ratios, 0.8 and 1.2 respectively. Within the linear boundaries of the contour plot, several partially elliptical contour bands of constant shunt resistance are illustrated. The bands range from about 3500 megaohms up to at least 7000 megaohms. Thus, the contour plot reveals that the ceramic material composition of the present invention enables production of a spark plug having a shunt resistance of at least 1000 megaohms at 1000 degrees Fahrenheit and, so far, most preferably, up to about 7000 megaohms at 1000 degrees Fahrenheit.

FIGS. 5 and 6 thus demonstrate that, based on the experimentation thus far conducted and disclosed herein, the optimized value of shunt resistance in the ceramic tends to follow the phase equilibrium line in the phase equilibrium diagram which extends between $CaO.SiO_2$ and $CaO.MgO.SiO_2$.

Based on this experimentation, it is further believed that this discovery may be extrapolated entirely across the phase equilibrium diagram along the phase equilibrium line extending between $CaO.SiO_2$ and $MgO.SiO_2$. More specifically, optimized shunt resistance is believed to exist within a bandwidth of the above-described line that can be described as having a $SiO_2$ to RO molar ratio between about 0.8:1 and 1.2:1.

Based on the experimentation above, the preferred ranges of the constituent materials have been determined. A ceramic material including 90 to 99 percent by weight of alumina, 0.01 to 1 percent by weight of a zirconium-based compound, and 1 to 10% by weight of an oxide mixture of a glass former and a network modifier, wherein the preferred molar ratio of the glass former to the network modifier ranges between about 0.8:1 and 1.2:1. The zirconium-based compound is preferably zirconia ($ZrO_2$), but may also include various organic and inorganic compounds and/or complexes which contain zirconium. Zirconium containing compounds of the present invention may include any organic or inorganic compound or complex which contains zirconium and which enables zirconium to be incorporated into the oxide mixture matrix in the course of sintering the ceramic while also providing shunt resistance and dielectric puncture resistance consistent with the results presented herein with respect to the use of zirconia as the zirconium containing compound. As has been illustrated herein, zirconia may be utilized as the zirconium containing compound of the present invention. It may be utilized by itself or in conjunction with other zirconium containing compounds as described herein. It is believed that other zirconium containing compounds of the present invention may include, for example, inorganic zirconium compounds such as zirconium orthosilicate, zirconium sulfate, zirconium nitrate, zirconium phosphide, zirconium silicide, and zirconium sulfide, as well as various organic compounds and inorganic and organic complexes which contain zirconium. The zirconium containing compound should contain an amount of zirconium equivalent to 0.01-1.0% by weight of zirconia. Further, as discussed in the Manning patent, zirconium compounds generally contain some hafnium as an impurity. It is believed that hafnium and hafnia can be substituted interchangeably herein when referring to zirconium and zirconia, respectively, and that mixtures of zirconium-based and hafnium-based compounds may be utilized in place of zirconium-based compounds, all within the scope of the present invention. Preferably, the glass former is $SiO_2$ and the network modifier is CaO, MgO, SrO, and/or BaO, but may also include alkaline metal oxides such as $Na_2O$, $K_2O$, $Li_2O$ and the like. More specifically, the network modifier is preferably composed primarily of CaO and secondarily of MgO.

A more preferred range of materials includes the ceramic material having alumina in an amount between about 94 and about 97% by weight, zirconia in an amount between about 0.1 and about 0.5% by weight, and the oxide mixture of the glass former and network modifier in an amount between about 2.5 and about 5.9% by weight, wherein the molar ratio of said glass former to the network modifier equals between about 0.9:1 and 1.1:1, such that oxide mixture can be described by a molar equation as follows:

$$(Mg_VCa_WSr_XBa_Y)O=ZSiO_2 \qquad (1)$$

wherein V+W+X+Y=1, and $0.8 \leq Z \leq 1.2$, and more preferably, wherein $0.9 \leq Z \leq 1.1$.

An even more preferred range includes the ceramic material having the alumina in an amount between about 95 and about 96.5% by weight, the zirconia in an amount between about 0.25 and about 0.35% by weight, and the oxide mixture in an amount between about 3.15 and about 4.75% by weight, wherein the network modifier includes CaO in an amount about 0.8 by mole fraction and MgO in an amount about 0.2 by mole fraction. The network modifier includes CaO in an amount between about 1.38 and about 1.95% by weight, and MgO in an amount between about 0.15 and about 0.43% by weight. The glass former comprises $SiO_2$ in an amount between about 1.87 to about 2.28% by weight.

In one specific embodiment, the ceramic material includes the alumina in an amount of about 95.67% by weight, the zirconia in an amount of about 0.31% by weight, and the oxide mixture in an amount of about 3.94% by weight. The oxide mixture includes CaO in an amount of about 1.55% by weight, MgO in an amount of about 0.27% by weight, and $SiO_2$ in an amount of about 2.12% by weight.

In another specific embodiment, the ceramic material includes the alumina in an amount of about 95.55% by weight, the zirconia in an amount of about 0.31%, CaO in an amount of about 2.04% by weight, $SiO_2$ in an amount of about 2.02% by weight, and no MgO.

In yet another specific embodiment, the ceramic material includes the alumina in an amount of about 95.84% by weight, CaO in an amount of about 2.05% by weight, $SiO_2$ in an amount of about 2.03% by weight, and no zirconia.

As discussed previously, network intermediates such as $Al_2O_3$ may be added to create alumino-silicate glass in order to further impede the motion of charge carriers. According to one preferred embodiment, $Al_2O_3$ in an amount as much as 40% by weight may be added to the oxide mixture. Also, the oxide mixture may be a calcium-alumino-silicate glass with up to 10% by weight of MgO or the other alkaline earth oxides added as network modifiers.

It is contemplated that the ceramic may also include various impurities, such as $K_2O$, $TiO_2$, $P_2O_5$, $Fe_2O_3$, and the like in a combined total amount of up to about between 0.01% and 0.50% by weight. Typically, however, such impurities are present in a combined total amount of about between 0.07% and 0.30%.

The experimentation reveals that a maximum in shunt resistance is achievable over a temperature range of 800 to 1200 degrees Fahrenheit when the molar ratio of $SiO_2$ to network modifier is about 1 to 1. Additionally, the shunt resistance is optimized when the ratio of CaO to RO is about 0.8 and when the amount of zirconia is about 0.3% by weight of the ceramic.

Further, it is believed that the zirconia not only improves the mechanical strength of the ceramic, but also improves the shunt resistance, by reducing crystallization within the matrix mixture when the ceramic is formed and cooled. Formation of a crystalline phase tends to result in an increase in conductivity of the oxide matrix mixture, and an attendant decrease in shunt resistance. When zirconia is added to the ceramic, at least a portion of the zirconia dissolves into the mixture of the glass former and network modifier and reduces crystallization thereof. Therefore, by reducing the crystallization within the oxide mixture matrix, the addition of zirconia tends to increase the shunt resistance. Nonetheless, despite the addition of zirconia, the oxide mixture matrix may contain some crystalline phases therein.

The ceramic material composition of the present invention enables the spark plug to be operated at higher voltages and at higher operating temperatures due to reduced susceptibility of dielectric failure of the material and increased shunt resistance of the material under such extreme conditions, thereby resulting in an attendant increase in shunt resistance of the spark plug.

The ceramic material composition of the present invention is resistant to dielectric breakdown whereby the integrity of the electrical resistivity of the material is maintained, to provide a spark plug with high shunt resistance.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A spark plug, comprising:
   a center electrode;
   a metal shell; and
   an insulator disposed between said center electrode and said metal shell, wherein said insulator comprises:
   between about 90 and 99% alumina by weight before firing;
   between about 0.01 and 1% zirconium containing compound by weight; and
   between about 1 and 10% oxide mixture by weight, said oxide mixture comprising:
   a glass former; and
   a network modifier;
   alumina in an amount between about 16% and about 40% by weight after firing; and
   wherein the molar ratio of the glass former to the network modifier ranges between about 0.8:1 and 1.2:1.

2. The spark plug of claim 1, comprising:
   said alumina in an amount between about 94 and about 97% by weight;
   said zirconium containing compound in an amount between about 0.1 and about 0.5% by weight; and
   said oxide mixture in an amount between about 2.5 and about 5.9% by weight, wherein the molar ratio of said glass former to said network modifier equals between about 0.9:1 and 1.1:1.

3. The spark plug of claim 2, comprising:
   said alumina in an amount between about 95 and about 96.5% by weight;
   said zirconium containing compound in an amount between about 0.25 and about 0.35% by weight; and
   said oxide mixture in an amount between about 3.15 and about 4.75% by weight, wherein said network modifier comprises at least one of MgO, CaO, SrO, BaO, $Na_2O$, $K_2O$, and $Li_2O$.

4. The spark plug of claim 3, wherein said network modifier comprises:
   CaO in an amount between about 0.7 and 0.9 by mole fraction; and
   MgO in an amount between about 0.1 and 0.3 by mole fraction.

5. The spark plug of claim 4, wherein said network modifier comprises:
   said CaO in an amount about 0.8 by mole fraction; and
   said MgO in an amount about 0.2 by mole fraction.

6. The spark plug of claim 3, wherein:
   said network modifier comprises:
   CaO in an amount between about 1.38 and about 1.95% by weight; and
   MgO in an amount between about 0.15 and about 0.43% by weight; and
   said glass former comprises $SiO_2$ in an amount between about 1.87 to about 2.28% by weight.

7. The spark plug of claim 6, comprising:
said alumina in an amount about 95.67% by weight;
said zirconium containing compound in an amount about 0.31% by weight; and
said oxide mixture in an amount about 3.94% by weight.

8. The spark plug of claim 7, wherein said oxide mixture comprises:
said CaO in an amount about 1.55% by weight;
said MgO in an amount about 0.27% by weight; and
said $SiO_2$ in an amount about 2.12% by weight.

9. The spark plug of claim 8, further comprising:
at least one of $Fe_2O_3$, $TiO_2$, $P_2O_5$, and $K_2O$ in a collective amount of about 0.07% by weight.

10. The spark plug of claim 9, comprising:
$Fe_2O_3$ in an amount of up to about 0.04% by weight;
$TiO_2$ in an amount of up to about 0.01% by weight;
$P_2O_5$ in an amount of up to about 0.01% by weight; and
$K_2O$ in an amount of up to about 0.01% by weight.

11. The spark plug of claim 3, comprising:
said alumina in an amount of about 95.55% by weight;
said zirconium containing compound comprising zirconia in an amount of about 0.31% by weight;
CaO in an amount of about 2.04% by weight; and
$SiO_2$ in an amount of about 2.02% by weight.

12. The spark plug of claim 11, further comprising:
$K_2O$ in an amount of up to about 0.01% by weight;
$TiO_2$ in an amount of up to about 0.02% by weight;
$P_2O_5$ in an amount of up to about 0.01% by weight; and
$Fe_2O_3$ in an amount of up to about 0.03% by weight.

13. The spark plug of claim 1, wherein:
said network modifier comprises at least one of MgO, CaO, SrO, BaO, $Na_2O$, $K_2O$ and $Li_2O$;
said glass former comprises $SiO_2$; and
said oxide mixture is described by the following molar equation $$(Mg_V Ca_W Sr_X Ba_Y)O \cdot Z SiO_2$$

wherein V+W+X+Y=1
and $0.8 \leq Z \leq 1.2$.

14. The spark plug of claim 1, wherein
said oxide mixture is a calcium alumino-silicate glass; and
said zirconium containing compound is $ZrO_2$ in an amount of between about 0.05 to 0.5%.

15. The spark plug of claim 14, wherein said calcium alumino-silicate glass comprises:
alumina in an amount of up to about 40% by weight;
MgO in an amount of up to about 10% by weight; and
a balance of CaO and $SiO_2$ in an amount between about 50 to about 99% by weight.

16. The spark plug of claim 15, wherein said $SiO_2$ comprises between about 40 to about 60% by weight of said balance of CaO and $SiO_2$.

17. The spark plug of claim 3, comprising:
said alumina in an amount of about 95.84% by weight;
CaO in an amount of about 2.05% by weight; and
$SiO_2$ in an amount of about 2.03% by weight.

18. The spark plug of claim 17, further comprising:
$K_2O$ in an amount of up to about 0.01% by weight;
$TiO_2$ in an amount of up to about 0.02% by weight;
$P_2O_5$ in an amount of up to about 0.01% by weight; and
$Fe_2O_3$ in an amount of up to about 0.03% by weight.

* * * * *